(12) United States Patent
Maddox

(10) Patent No.: US 11,475,729 B2
(45) Date of Patent: Oct. 18, 2022

(54) ELECTRONIC GAMING MACHINE WITH EMULATED THREE DIMENSIONAL DISPLAY

(71) Applicant: IGT, Las Vegas, NV (US)

(72) Inventor: Robert W. Maddox, Sparks, NV (US)

(73) Assignee: IGT, Las Vegas, NV (US)

( * ) Notice: Subject to any disclaimer, the term of this patent is extended or adjusted under 35 U.S.C. 154(b) by 105 days.

(21) Appl. No.: 16/937,791

(22) Filed: Jul. 24, 2020

(65) Prior Publication Data
US 2021/0012607 A1    Jan. 14, 2021

Related U.S. Application Data

(63) Continuation of application No. 15/448,693, filed on Mar. 3, 2017, now abandoned.

(51) Int. Cl.
*G07F 17/32* (2006.01)
*H04N 13/315* (2018.01)
*H04N 13/398* (2018.01)
*H04N 13/395* (2018.01)

(52) U.S. Cl.
CPC ...... *G07F 17/3211* (2013.01); *G07F 17/3209* (2013.01); *G07F 17/3288* (2013.01); *H04N 13/315* (2018.05); *H04N 13/395* (2018.05); *H04N 13/398* (2018.05); *H04N 2213/001* (2013.01)

(58) Field of Classification Search
CPC ............. G07F 17/3211; G07F 17/3209; G07F 17/3288; H04N 13/395; H04N 13/315; H04N 13/398
See application file for complete search history.

(56) References Cited

U.S. PATENT DOCUMENTS

| 2008/0113745 | A1* | 5/2008 | Williams ............ G07F 17/3202 463/20 |
| 2010/0048288 | A1 | 2/2010 | Canterbury |
| 2010/0091012 | A1* | 4/2010 | Newton ............... H04N 13/398 345/419 |
| 2011/0159929 | A1* | 6/2011 | Karaoguz ............ H04N 13/341 455/566 |
| 2012/0270649 | A1 | 10/2012 | Griswold |

* cited by examiner

*Primary Examiner* — Yingchuan Zhang
(74) *Attorney, Agent, or Firm* — Sage Patent Group

(57) ABSTRACT

A gaming machine includes a processor, a video controller coupled to the processor, a display device coupled to the video controller, and an input device coupled to the processor and receiving an input from a player. The display device includes a rear display panel and a front display panel arranged between the player and the rear display panel, the front display panel including an electrochromic display panel that is spaced apart from the rear display panel in a viewing direction of the player. The video controller causes the display device to alternate between a first state for displaying a first image on the rear display panel and a second state for displaying a second image on the front display panel. In the first state, the video controller displays the first image on the rear display panel and causes the front display panel to be transparent, and in the second state, the video controller displays the second image on the rear display panel and causes the front display panel to be opaque.

20 Claims, 11 Drawing Sheets

ELECTRONIC GAMING MACHINE WITH EMULATED THREE DIMENSIONAL DISPLAY

CROSS REFERENCE TO RELATED APPLICATIONS

This application is a continuation of, and claims priority to and the benefit of, U.S. patent application Ser. No. 15/448,693, which was filed Mar. 3, 2017, the entire contents of which is incorporated by reference herein.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Electronic and electro-mechanical gaming machines (EGMs) are systems that allow users to place wager on the outcome of random events, such as the spinning of mechanical or virtual reels or wheels, the playing of virtual cards, the rolling of mechanical or virtual dice, the random placement of tiles on a screen, etc.

Modern electronic gaming machines typically include one or more full color solid state displays, such as liquid crystal displays (LCDs), organic light emitting displays (OLEDs) or the like, on which game graphics are displayed. The progress and outcomes of games can be displayed on a relatively large display, and other game graphics, such as button labels, game theme illustrations, and the like can be displayed on smaller displays on the gaming machine.

Some LCD displays can be multi-layer displays (MLD) that produce an appearance of three-dimensional depth in displayed graphics images by displaying multiple two-dimensional images on corresponding multiple overlapping LCD displays. Such multi-layer displays are available from, for example, PureDepth, Inc. of Redwood City, Calif. The PureDepth MLD's can include two overlapping stacked LCD displays that are separated by a distance and are separately addressable to provide separate or coordinated images between the LCDs. The PureDepth units provide a binocular depth cue and intrinsic motion parallax, where the x and y distance changes between objects displayed on different video planes depending on viewing angle.

A multilayer projection display including first and second projection screen panels is disclosed in U.S. Pat. No. 8,608, 319, assigned to the assignee of the present application. The first and second panels can be controlled to alternate between substantially opaque and substantially transparent states. The display further includes a projector that projects an image onto the first panel when the first panel is substantially opaque, and to project the image onto the second panel when the second panel is substantially opaque.

SUMMARY

A gaming machine includes a processor, a video controller coupled to the processor, a display device coupled to the video controller, and an input device coupled to the processor and receiving an input from a player. The display device includes a rear display panel and a front display panel arranged between the player and the rear display panel, the front display panel including an electrochromic display panel that is spaced apart from the rear display panel in a viewing direction of the player. The video controller causes the display device to alternate between a first state for displaying a first image on the rear display panel and a second state for displaying a second image on the front display panel. In the first state, the video controller displays the first image on the rear display panel and causes the front display panel to be transparent, and in the second state, the video controller displays the second image on the rear display panel and causes the front display panel to be opaque.

A display device includes a video controller, a rear display panel, and a front display panel overlapping the rear display panel in a viewing direction, the front display panel including an electrochromic display panel that is spaced apart from the rear display panel in a viewing direction. The video controller causes the display device to alternate between a first state for displaying a first image on the rear display panel and a second state for displaying a second image on the front display panel. In the first state, the video controller displays the first image on the rear display panel and causes the front display panel to be transparent, and in the second state, the video controller displays the second image on the rear display panel and causes the front display panel to be opaque.

A method of operating a display device including a rear display panel and a front display panel including an electrochromic display panel that is spaced apart from the rear display panel in a viewing direction is provided. The method includes generating a first image, causing the front display panel to be in a transparent state, displaying the first image on the rear display panel, generating a second image, causing the front display panel to change from the transparent state to an opaque state, and displaying the second image on the rear display panel while the front display panel is in the opaque state.

DETAILED DESCRIPTION

Embodiments of the inventive concepts provide electronic gaming machines with emulated three dimensional displays and display units capable of emulating three dimensional images using overlapping displays.

Three Dimensional Emulating Display

Figure 1:
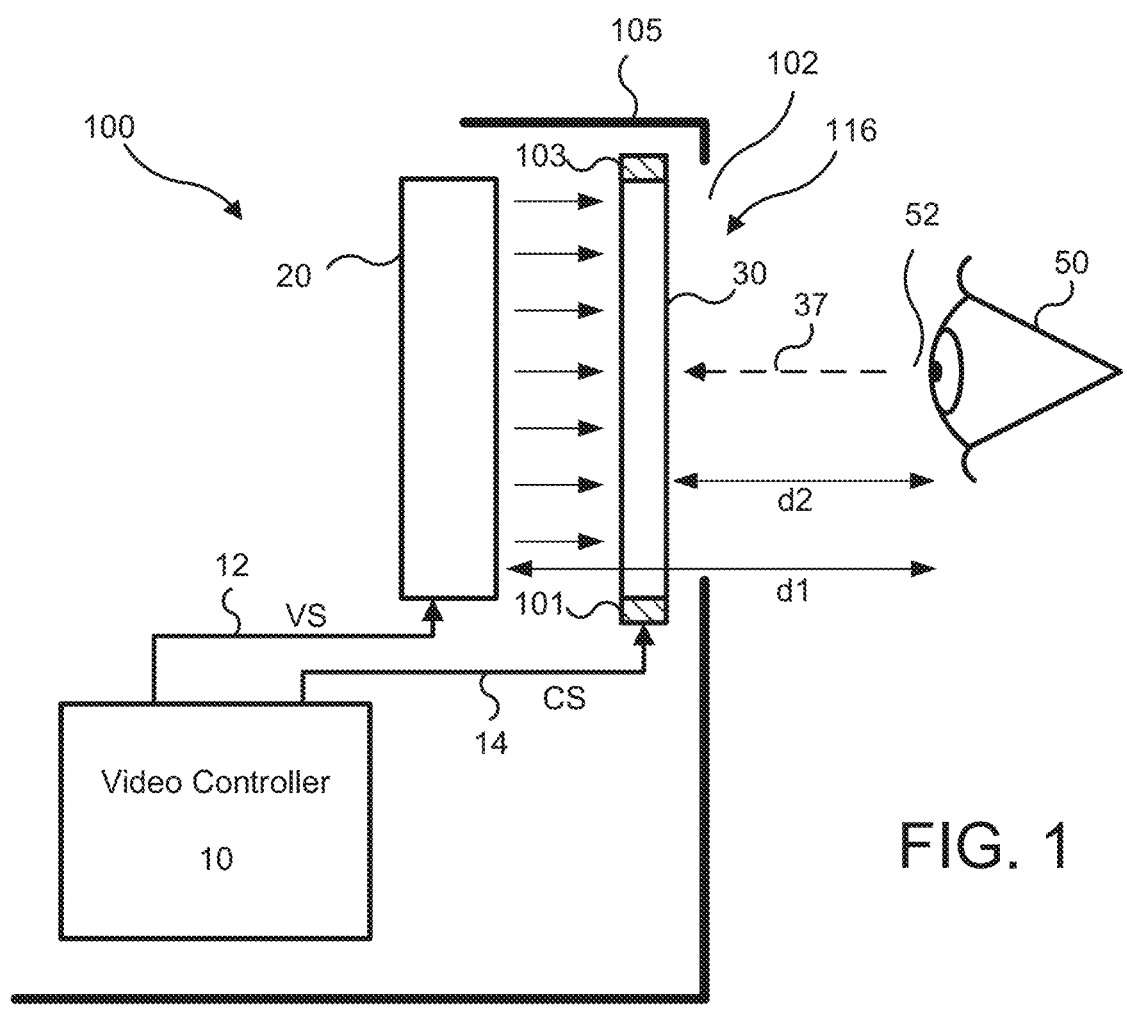
FIG. 1 illustrates some features of a three dimensional emulating display according to some embodiments.

A display unit capable of emulating a three dimensional display according to some embodiments is illustrated in FIG. 1. In particular, FIG. 1 schematically illustrates an electronic gaming machine 100 including a display device 116 mounted within a housing 105. The display device 116 is mounted adjacent an aperture 102 in the housing 105 so that the display device 116 is viewable by a viewer 50. The display device 116 includes a rear display panel 20 and a front display panel 30 mounted in front of the rear display panel 20 from the perspective of the viewer 50. The front display panel 30 at least partially overlaps the rear display panel 20 in the viewing direction 37 of the viewer 50 such that an image displayed on the second panel 30 can appear to be superimposed over an image displayed on the rear display panel 20.

The rear display panel 20 may include, without limitation, a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

The front display panel 30 is made from material that varies in transparency in response to changes in electric current, such as, for example, polymer-dispersed liquid crystal (PDLC), which is available from Sager Glass Technology Co. of Beijing, China. The PDLC contains droplets of liquid crystal uniformly dispersed in a flexible plastic film. When no power is supplied to the film, the crystals scatter randomly and diffuse incoming light in many different directions, and the light is not visible through the film. When power is applied to the film, the crystals become aligned and the film becomes transparent. Cholesteric liquid crystals can be used, in which case the film can also polarize the incoming light. Suspended particle devices (SPD), electrochromic devices, and the like can be used as alternatives to PDLC material. SPD's and PDLC devices become transparent when a first voltage is applied, and become opaque or translucent when a second voltage is applied, with the second voltage being low or approximately zero. In contrast, electrochromic devices become opaque when applied with a voltage, and transparent when little or no voltage is applied. The front display panel 30 may attain varying levels of translucency and opaqueness. For example, while a PDLC device is ordinarily either transparent or opaque, SPD's and electrochromic devices can have varying degrees of transparency, opaqueness, or translucency, depending on the applied voltage level.

The front and rear display panels 20, 30 are at least partially overlapping, so that a line of sight passes from a viewing point 52 in a viewing direction 37 through the front display panel 30 to the rear display panel 20. The rear display panel 20 forms alternating images, e.g., graphics images in bitmap form, which are received from the video controller 10, in rapid succession. In particular, the rear display panel 20 displays a first image 221 (FIG. 4) and then projects a second image 222 onto the front display panel 30. The images 221, 222 appear at alternating times as the front display panel 30 alternates between transparent and translucent (i.e., opaque) states. In particular, the front display panel 30 is caused to be transparent while the rear display panel displays a first image 221 for at least a short period of time. After the first image 221 has been displayed, the front display panel 30 transitions to an opaque or translucent state for at least a short period of time, during which time the rear display panel projects the second image 222 onto the front display panel 30. The front display panel 30 then transitions back to the first (transparent) state, and the cycle is repeated. This two-state cycle repeats as long as the display 116 is in an operational mode.

The front display panel 30 transitions between the transparent and opaque states, and vice versa, in response to changes in voltage levels applied to electrical terminals 101, 103 of the front display panel 30 by the video controller 10 via a signal VS2.

As a result of this alternation between transparent and opaque states, a first image appears on the rear display panel 20 and is visible at the viewing point 52 when the front display panel 30 is in a transparent state. A second image appears on the front display panel 30 when the front display panel 30 is in an opaque state. The front display panel 30 alternates between transparent and opaque states (and the rear display panel alternates between displaying the first image and the second image) at a frequency that is sufficiently high to cause the alternating images to appear (at least to a human viewer) to blend into a single image having a three-dimensional appearance when the viewer's eye 50 is located at or near the viewing point 52. The three-dimensional appearance results from the difference in distance from the eye 50 to the rear display panel 20 (distance d1) and the front display panel 30 (distance d2).

When the d1-d2 distance between the panels is about one to two inches, or a value of similar magnitude, a parallax effect can be created between the first and second images, so that, for example, as the viewer's eye 50 moves parallel to the panels 20, 30 the first image 221 that appears to be located on the rear display panel 20 may appear to move by slightly greater distances than the image 221 that is displayed on the front display panel 30, thereby creating a three-dimensional appearance. In one example, the first and second images 221, 222 are both the same image, and the three-dimensional effect is produced primarily by the distance between the panels 20, 30. In another example, the rear display panel 30 can display multiple images, e.g., a different image for each panel, so that the first image 221 is different from the second image 222. The parallax effect is described in more detail in the context of a multilayer display (MLD), in which multiple liquid crystal displays produce parallax, in, for example, U.S. Patent Application Publication No. 2008/0113745A1 titled "Separable Game Graphics On a Gaming Machine" having Ser. No. 11/858,693, which is incorporated herein by reference in its entirety and for all purposes.

The image planes of rear display panel 20 and the front display panel 30 (that is the surfaces on which the first and second displays generate an image) are spaced apart by a distance d that may be selected based on an expected viewing distance d2 of the viewer's eye 50 to the front display panel 30. In particular, the rear display panel 20 is spaced apart from the front display panel 30 by a distance sufficient to impart binocular depth information to the viewer based on an expected viewing distance of the viewer. For example, the distance d1-d2 may be selected to be between 5% and 10% of the expected viewing distance d2, so that the viewer can easily perceive the distance between the viewing planes of the two panels. For example, the eyes of a player of an electronic gaming machine are typically positioned about 20 centimeters from the primary display screen. Thus, for an electronic gaming machine, the image planes of the display panels 20, 30 may be positioned about 1-2 cm apart.

Referring again to FIG. 1A, images may be displayed sequentially on the rear display panel 20 and the front display panel 30. The display of images on the rear display panel 20 and the front display panel 30 is controlled by a video controller 10, which outputs first and second video control signals VS1, VS2 to the rear display panel 20 and the front display panel 30, respectively.

Figure 2:
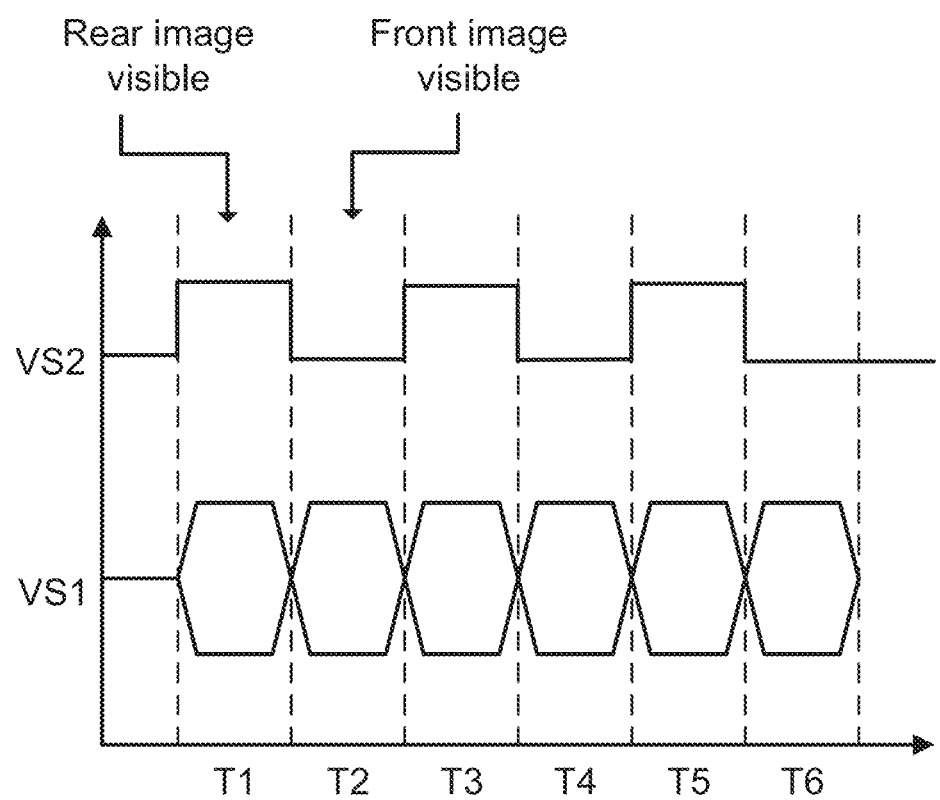
FIG. 2 is a graph that illustrates operation of a three dimensional emulating display according to some embodiments.

FIG. 2 is a timing diagram illustrating an example of the video control signals VS1 and VS2 that drive the display panels 20, 30, respectively. In a first time period T1, which may for example be 10 ms in duration in some embodiments, the rear display panel 20 displays a first image in response to the first video signal VS1. During the first time period T1, a voltage signal may be applied to the front display panel 30, causing the front display panel 30 to be transparent, allowing a viewer 50 to see the image displayed on the rear display panel 20 at the first viewing distance d1. In a second time period T2, which may also be 10 ms in duration, the second video signal VS2 is turned off to cause the front display panel 30 to be opaque or translucent. During this time, the first video signal VS1 may cause the rear display panel 20 to display a second image. Since the front display panel 30 is opaque at this time, the second image is projected onto the front display panel 30 where it is viewed by the viewer 50 at the second viewing distance d2. When the time periods are 10 ms in duration, each display panel 20, 30 may display one frame every 20 ms, corresponding to an effective frame rate of 50 frames/second.

In general, a viewer judges depth or distance of an object in a scene using both monocular (one-eyed) information and binocular (two-eyed) information. For viewing objects at close range, e.g. less than about 30 meters, the brain can use binocular information to judge distance.

The perception of binocular information is based on the fact that the eyes are separated, on average, by about six centimeters, and thus each eye perceives slightly different views of the same object/scene. Moreover, the placement of the object image is different on one of the viewer's retinas than the other. This difference in retinal position is called retinal disparity or binocular disparity. While not intending to be bound by a particular theory, it is presently believed that depth perception occurs at the level of the primary visual cortex or perhaps higher in the association cortex where individual neurons receiving input from the two retinas fire specifically when retinal disparity exists. Retinal disparity is thus believed to be an important contributor to depth perception particularly for scenes located close to the viewer.

Figure 3A:
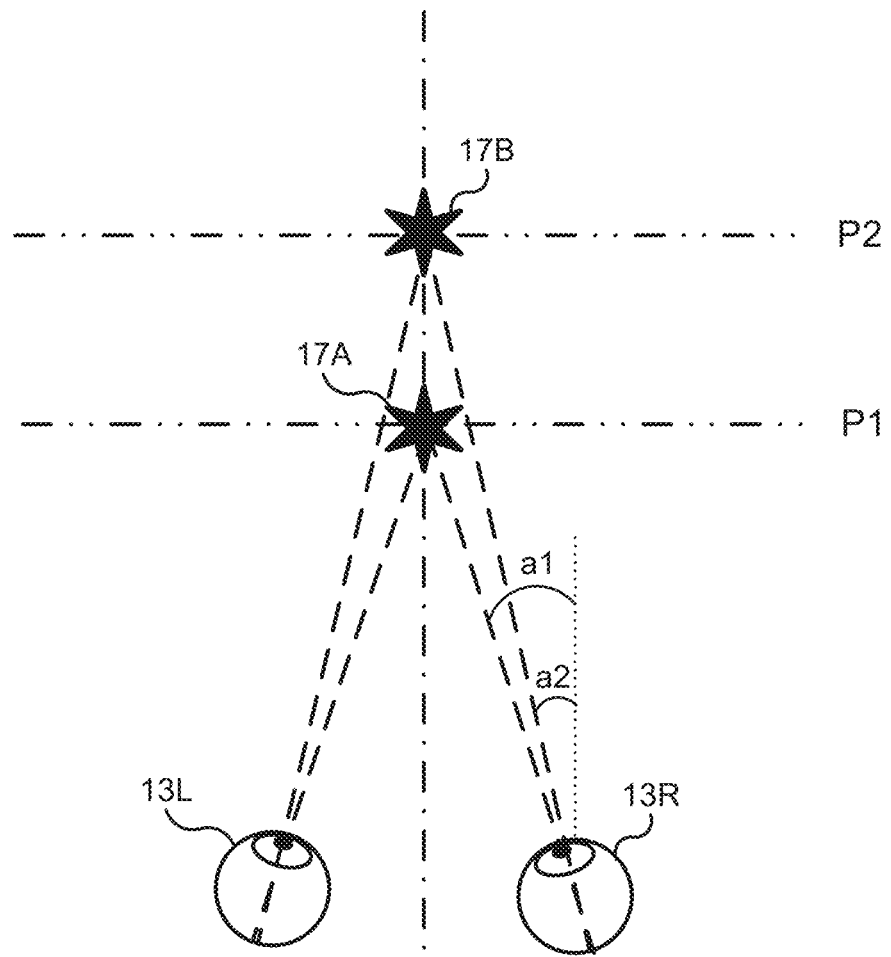
FIG. 3A illustrates parallax angles between a viewer's left and right eyes when viewing objects in a near plane and a far plane.

Binocular information includes stereopsis, or binocular parallax, convergence and shadow stereopsis. Parallax is a displacement or difference in the apparent position of an object viewed along two different lines of sight, and is measured by the angle or half angle between the two lines of sight. FIG. 3A illustrates parallax half-angles a1, a2 between a viewer's left and right eyes 13L, 13R when viewing objects 17A, 17B in a near plane P1 and a far plane P2. When focusing on the object 17A in the near plane, the parallax angle a1 experienced by the viewer is greater than the parallax angle a2 experienced when the viewer focuses on the object 17B in the far plane P2. Thus, the viewer interprets the object 17A in the near plane P1 as being closer to the viewer than the object 17B in the far plane P2. Convergence of the focus onto the image also provides kinesthetic sensations that aid in depth perception. Stereoscopic images with different shadows are also combined by a viewer's brain to impart depth perception.

Figure 3B:
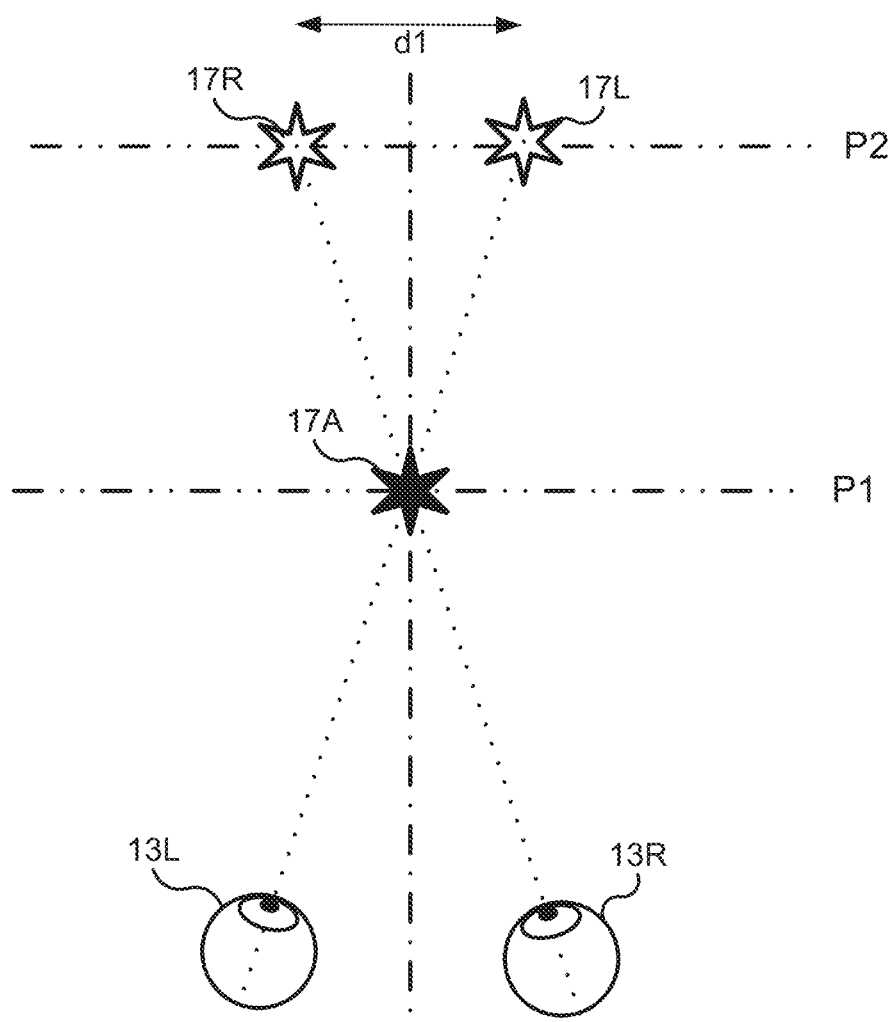
FIG. 3B illustrates generation of a three dimensional image.

Stereoscopic images can be used to generate three dimensional images. For example, referring to FIG. 3B, a left image 17L (i.e. an image displayed to the user's left eye) and a right image 17R (displayed to the user's right eye) are formed on a real image plane P2. The left image 17L and the right image 17R are displaced by a distance d1 that is selected such that the two images will converge at a virtual image plane P1 that is closer to the viewer than the real image plane P2. The viewer's brain combines the two images into a single object 17A that appears to be closer to the viewer than the actual images on the real image plane P2, giving the scene an appearance of three dimensionality.

Images can be selectively displayed to a viewer's eyes in a number of different ways. In anaglyphic displays, a stereoscopic motion or still picture in which the right component of a composite image usually red in color is superposed on the left component in a contrasting color to produce a three-dimensional effect when viewed through correspondingly colored filters in the form of glass having, e.g., different colored lenses. The left image is generated using one color and the right image is generated using the other color. The filters filter out the unwanted image so that the left eye sees only the left image and the right eye sees only the right image. Polarized filters can also be used to cause the left and right eye to see different images.

Some three dimensional displays do not require filtered lenses, however. In those systems, two different images are displayed to the user. The system displays an image for the left eye and then one for the right eye, alternating in very quick succession, and the viewer's brain synthesizes the images into a single three dimensional image. Such a system is referred to as an "active" 3D display system. In order to generate a three dimensional image in this manner, the location of the viewer's eyes must be known or estimated, and it is difficult for more than one person to see a three dimensional image generated by an active 3D system at the same time. That is, another viewer (whose eyes are not located where the targeted viewer's are) will see a distorted or blurred image.

In contrast, a passive 3D display can display 3D imagery that is viewed by any person viewing the display.

For viewing distances of about 30 meters or more, the brain typically relies on monocular information, as the parallax angle becomes negligible and the retinal images seen by both eyes are almost identical. Monocular information includes occlusion, perspective, motion parallax, shadowing and lighting, and known proportions. Occlusion occurs when one object partially hides another, and indicates to the viewer that the partially hidden object is farther away. Perspective uses the relative distance between converging lines to estimate distance. That is, parallel lines in a three dimensional scene appear to converge at a distance. The relative distances between objects in a scene with parallel lines may be estimated by the viewer based on their positions along the converging lines.

Depth can also be estimated based on motion parallax, which occurs as the scene moves relative to the viewer (or vice versa). That is, as the viewer moves relative to the scene, nearby objects appear to move more quickly than distant objects. Additionally, patterns of light and dark can give an impression of depth, and bright colors tend to seem closer than dull colors.

Finally, known proportions can be used to judge distance. If the viewer knows how large an object is supposed to be relative to other objects scene, its depth within the scene can be estimated.

Even though these monocular cues provide some depth vision so that the world does not look "flat" even when viewed with just one eye, viewing a scene with binocular vision gives a more vivid sense of depth and of stereopsis.

Some embodiments of the inventive concepts provide display systems that emulate three dimensional images by utilizing monocular depth clues while also providing binocular depth clues. The systems may generate quasi-3D images that are viewable by multiple viewers at different viewing locations/viewing depths.

Figure 4:
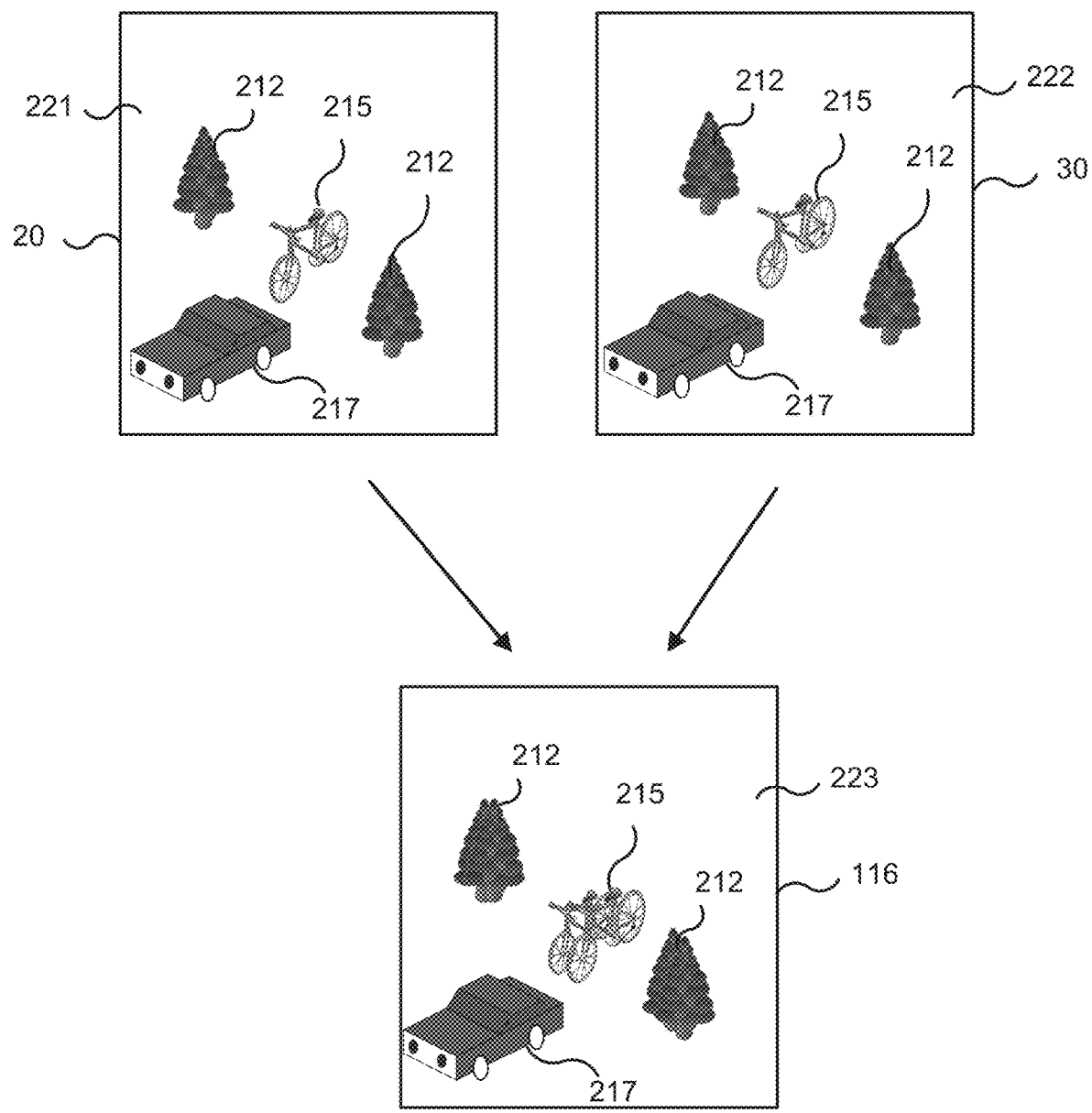
FIG. 4 illustrates the generation of emulated three dimensional images using a three dimensional emulating display according to some embodiments.

FIG. 4 illustrates the generation of emulated three dimensional images using the system described above. In particular, FIG. 4 illustrates a first image 221 displayed on the rear display panel 20 and a second image 222 displayed on the electrochromic front display panel 30. The images may be displayed in an alternating manner or simultaneously as described above. When viewed by a viewer 50, the images combine to produce the composite image 223 shown on the display device 116.

In particular, the first image 221 displayed on the rear display panel 20 includes several objects, including trees 212, a bicycle 215 and a car 217. The second image 222 displayed on the front display panel 30 also includes trees 212, a bicycle 215 and a car 217. However, the positions of the trees 212 and bicycle 215 may be slightly different from one image to the other, while the position of the car 217 may be the same in both images.

In some embodiments, the car may be displayed only in the second image 222 so that the viewer obtains a binocular depth cue that indicates that the car 217 should be perceived as being closer to the viewer in the scene than the trees 212 and the bicycle 215. As noted above, binocular depth cues are important for the viewer to perceive a scene as having three dimensionality.

In order to give the scene more three dimensionality, monocular depth cues can be added to the first image 221 and/or the second image 222. For example, any one of occlusion, perspective, motion parallax, shadowing and/or lighting can be added to objects in the first image 221 and/or the second image 222 to provide additional cues to the viewer. For example, as shown in FIG. 4, the trees 212 and bicycles 215 may have slightly different positions from one image to the other and/or be slightly out of focus so that the viewer perceives them as being behind the car 217. Moreover, for objects in the same image, relative proportions of objects can be altered to enhance the appearance of three dimensionality.

For example, a shadow of an object in the second image 222 can be added over an object in the first image 221 to provide a visual cue that the object in the second image 222 is closer than the object in the first image 221. Likewise, a velocity of movement of an object in the second image 222 can be increased relative to a velocity of an object in the first image 221 to provide a visual cue that the object in the second image 222 is closer than the object in the first image 221.

It will also be appreciated that monocular cues such as shading, shadowing, parallax, relative motion, occlusion, etc., may be used to indicate differences in depth between objects displayed on the same image plane. Thus, for example, monocular cues can be provided in the first image 221 shown in FIG. 4A to provide visual cues to the relative depth of the bicycle 215 and the trees 212.

Figure 5A:
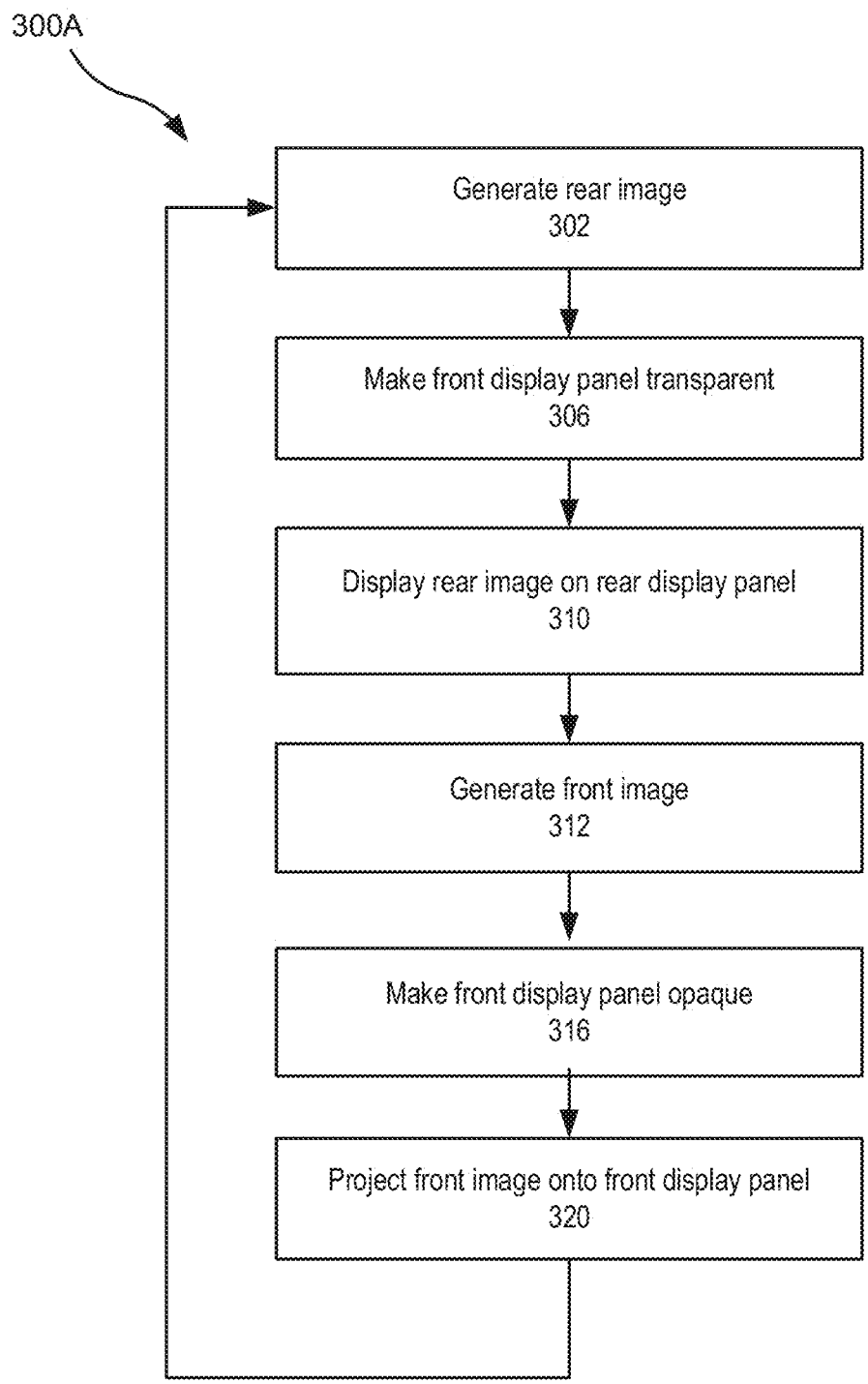
FIGS. 5A and 5B are process flow diagrams illustrating operations of systems/methods according to various embodiments.

FIG. 5A is a flowchart illustrating operations 300A of a display device 116 according to some embodiments. Referring to FIGS. 1A, 1B and 5A, in some embodiments, operations may begin at block 302 when the video controller 10 generates or receives a background image. The video controller 10 sends an appropriate video signal VS2 to the electrochromic front display 30 to make the electrochromic front display 30 transparent, such as, for example, by applying a sufficient voltage to the electrochromic front display 30 (block 306). The video controller 10 then sends an appropriate video signal VS1 to the rear display panel 20 to cause the rear display panel 20 to display the background image (block 310).

The video controller 10 then generates or receives a foreground image (block 312). The video controller 10 then sends an appropriate video signal VS2 to the electrochromic front display panel 30 to cause the electrochromic front display panel 30 to be opaque or translucent (block 316).

The video controller 10 sends an appropriate video signal VS1 to the rear display panel 20 to make the rear display panel 20 display the front image, which is projected onto the electrochromic front display panel 30 (block 320).

Figure 5B:
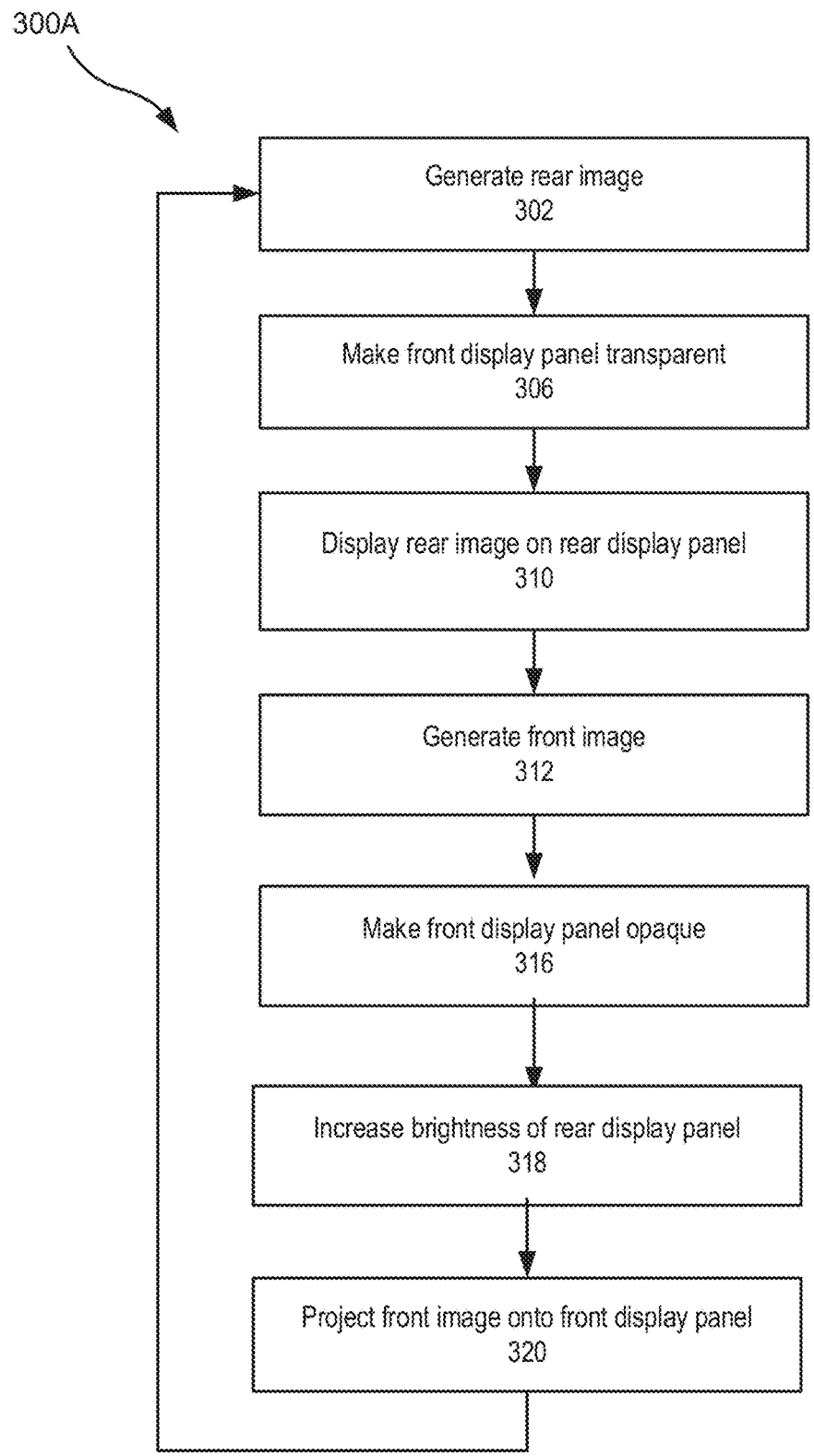

Further embodiments are illustrated in FIG. 5B. The operations of FIG. 5B are similar to those of FIG. 5A, except that when the front image is projected onto the electrochromic front display panel 30, brightness of the rear display panel 20 increased (block 318) to compensate for absorption by the electrochromic front display panel 30.

Figure 6:
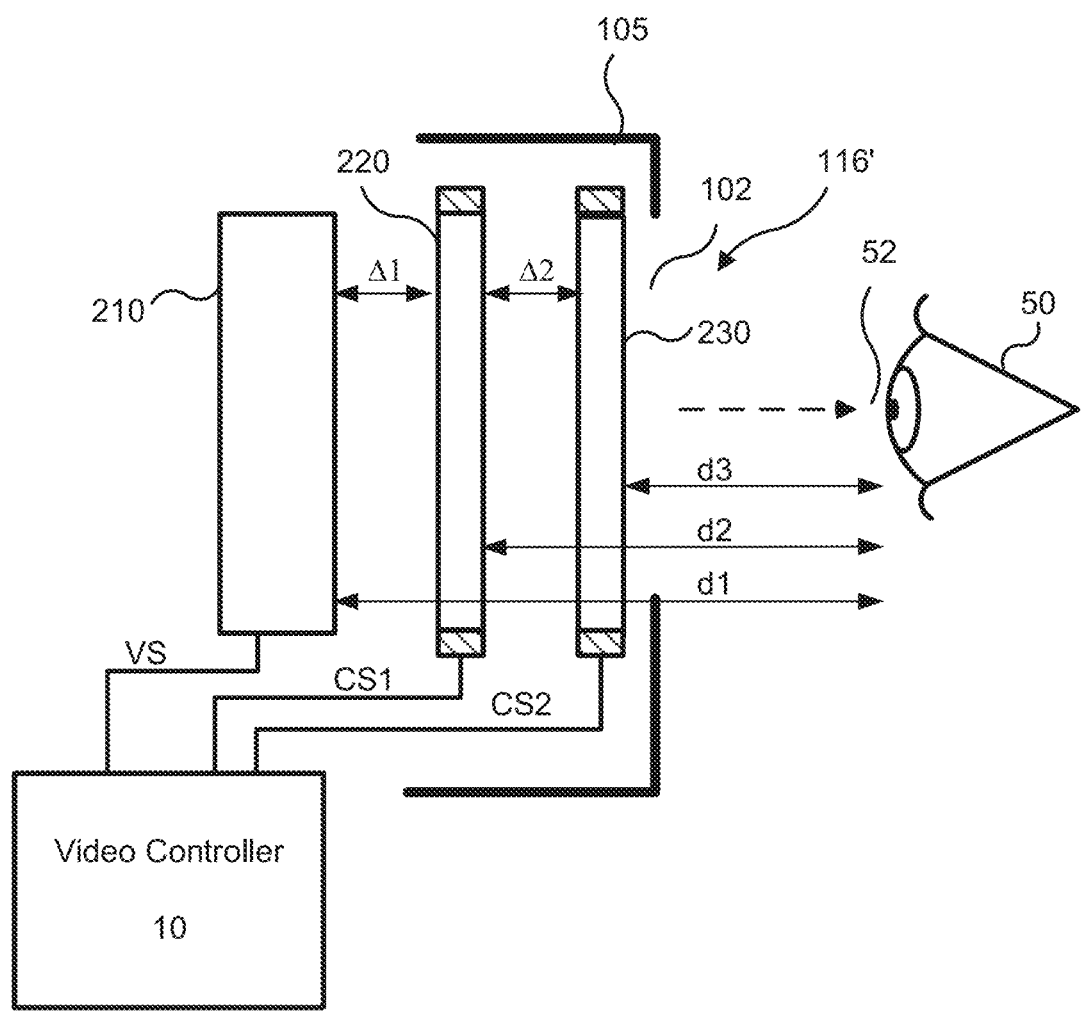
FIG. 6 illustrates some features of a three dimensional emulating display according to further embodiments.

FIG. 6 illustrates an embodiment of a display device 116' that includes three overlapping panels, namely, a rear display panel 210, a first electrochromic display panel 220 and a second electrochromic display panel 230 aligned with an aperture 102 in a housing 105. Each of the display panels may be driven by the video controller 10, although it will be appreciated that multiple video controllers may be used. Images can be displayed simultaneously and/or sequentially on the rear display panel 210, the first electrochromic display panel 220 and the second electrochromic display panel 230 to provide additional binocular depth cues to the viewer 50. The rear display panel 210 may have a viewing depth d1, the first electrochromic display panel 220 may have a viewing depth d2, and the second electrochromic display panel 230 may have a viewing depth d3. The rear display panel 210 and the first electrochromic display panel 220 may be separated by a distance Δ1, while the first electrochromic display panel 220 and the second electrochromic display panel 230 may be separated by a distance Δ2. The distances Δ1 and Δ2 may be different or may be the same. Providing different distances may provide more options in choosing how much of a visual depth cue to give viewers. For example, when Δ1 and Δ2 are the same, displayed objects can have a physical displacement distance of either Δ1 or 2 Δ1. In contrast, when Δ1 and Δ2 are different, displayed objects can have a physical displacement distance of Δ1, Δ2 or Δ1+Δ2.

Electronic Gaming Machines

Figure 7A:
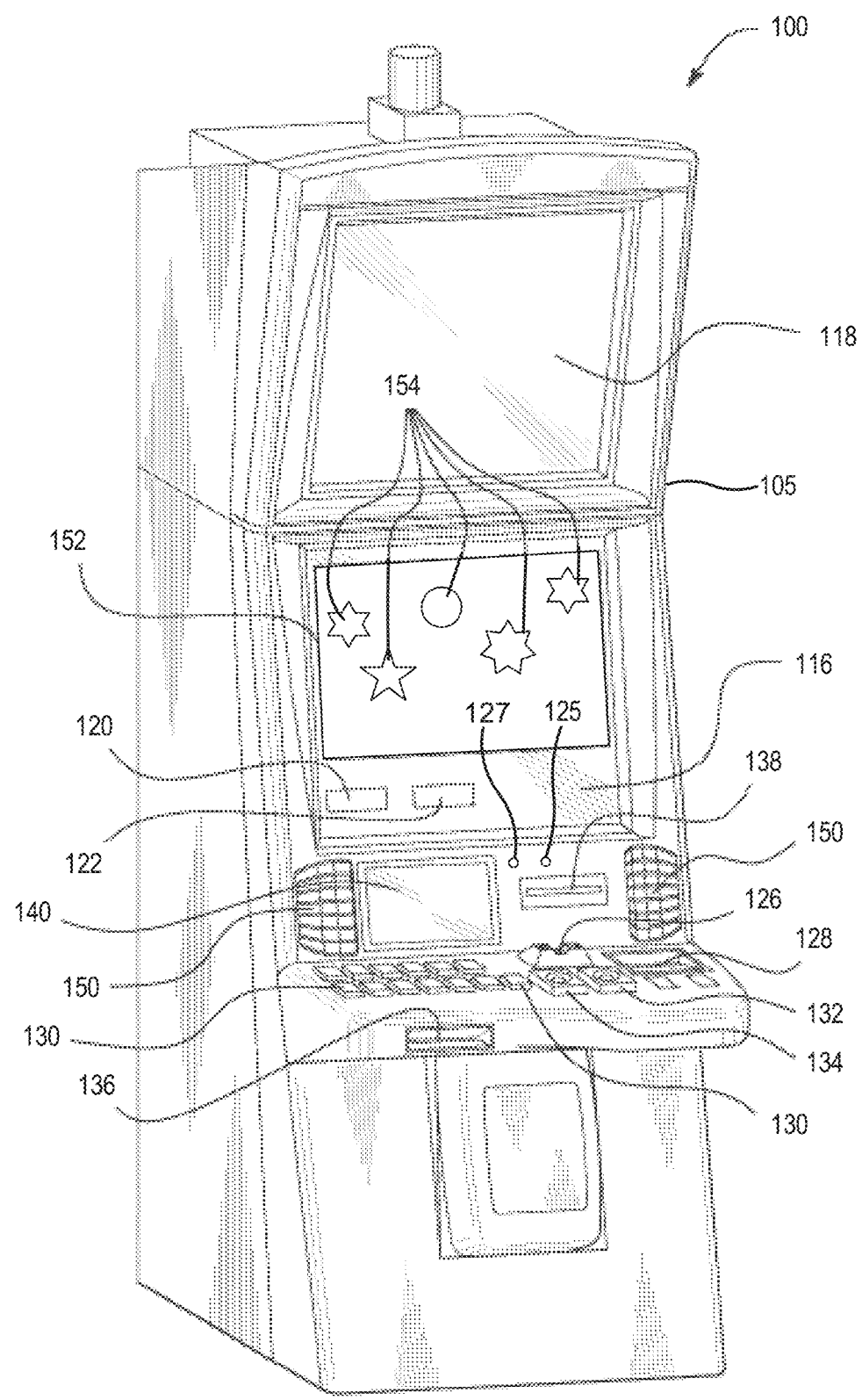
FIG. 7A is a perspective view of an electronic gaming device including a three dimensional emulating display according to some embodiments according to some embodiments.
Figure 7B:
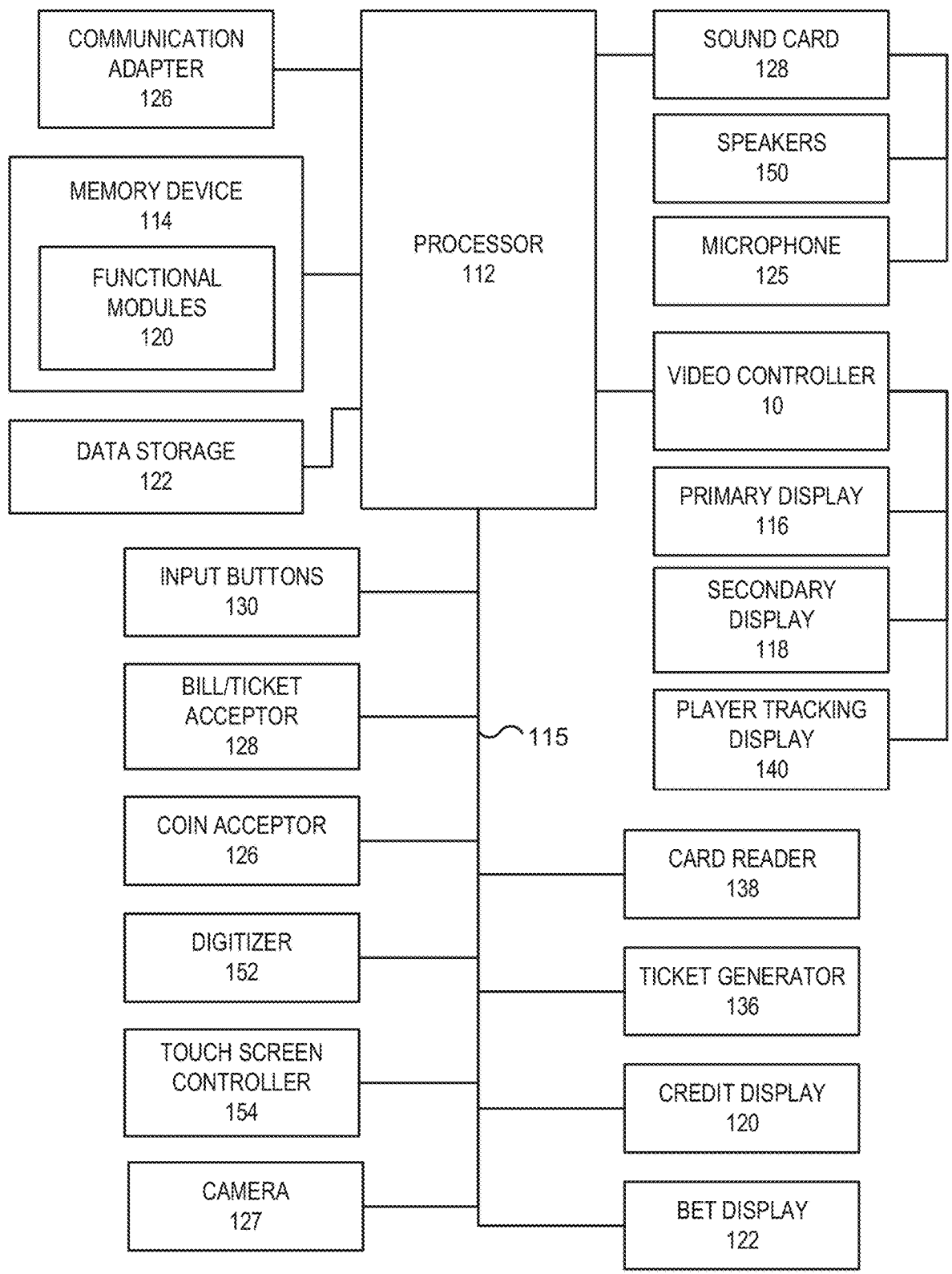
FIG. 7B is a schematic block diagram illustrating an electronic configuration for a gaming device according to some embodiments.
Figure 7C:
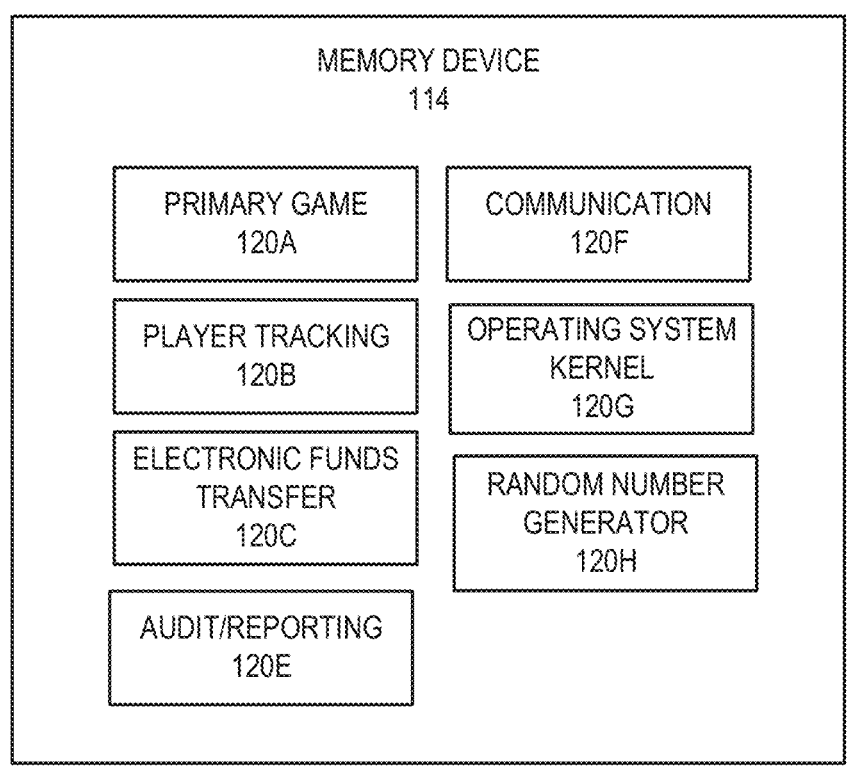
FIG. 7C is a block diagram that illustrates various functional modules of an electronic gaming device according to some embodiments.

An example of an electronic gaming machine (EGM) that can host hybrid games according to various embodiments is illustrated in FIGS. 7A, 7B, and 7C, in which FIG. 7A is a perspective view of an EGM 100 illustrating various physical features of the device, FIG. 7B is a functional block diagram that schematically illustrates an electronic relationship of various elements of the EGM 100, and FIG. 7C illustrates various functional modules that can be stored in a memory device of the EGM 100. The embodiments shown in FIGS. 7A to 7C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 7A and 7B. For example, referring to FIG. 7A, an EGM 100 may include a support structure, housing or cabinet 105 which provides support for a plurality of displays, inputs, outputs, controls and other features that enable a player to interact with the EGM 100.

The EGM 100 illustrated in FIG. 7A includes a number of display devices, including a display device 116 located in a central portion of the housing 105 and a secondary display device 118 located in an upper portion of the 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 7A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The input buttons 130 may include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. While the example EGM 100 illustrated in FIGS. 7A and 7B includes a game play activation device in the form of a game play initiation button 132, it should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 7B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 7B, operation of the display device 116, the secondary display device 118 and the player tracking display 140 may be controlled by a video controller 10 that receives video data from a processor 112 or directly from a memory device 114 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 112. In some embodiments however, the credit display 120 and/or the bet display 122 may be driven by the video controller 10.

Referring again to FIG. 7A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118. 140 may be of any suitable size, shape, and/or configuration. The display devices 116, 118, 140 may include flat or curved display surfaces. At least one of the display devices 116, 118, 140 includes a three dimensional emulating display as described herein.

The display devices 116, 118, 140 and video controller 10 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes an acceptor configured to receive a physical item having a monetary value associated with the received physical item. For example, the EGM 100 may include a bill/ticket acceptor 128 that allows a player to deposit credits in the EGM 100 in the form of paper money or a ticket/credit slip, and a coin acceptor 126 that allows the player to deposit coins into the EGM 100.

The EGM 100 also includes features that enable a player to withdraw credits from the EGM 100, such as in the form of a payout of winnings, credits, etc. For example, the EGM 100 may include a ticket dispenser 136 that is configured to generate and provide a ticket or credit slip representing a payout and/or a credit balance. The ticket or credit slip is printed by the EGM 100 when the cashout button 134 is pressed, and typically includes a barcode or similar device that allows the ticket to be redeemed via a cashier, a kiosk, or other suitable redemption system, or to be deposited into another gaming machine.

While not illustrated in FIG. 7A, the EGM 100 may also include a note dispenser configured to dispense paper currency and/or a coin generator configured to dispense coins or tokens in a coin payout tray.

The EGM 100 may further include one or more speakers 150 controlled by one or more sound cards 128 (FIG. 7B). The EGM 100 illustrated in FIG. 7A includes a pair of speakers 150. In other embodiments, additional speakers, such as surround sound speakers, may be provided within or on the housing 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 7B is a block diagram that illustrates logical and functional relationships between various components of an EGM 100. As shown in FIG. 7B, the EGM 100 may include a processor 112 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 112 may be variously referred to as a "controller," "microcontroller," "microprocessor" or simply a "computer." The processor may further include one or more application-specific integrated circuits (ASICs).

Various components of the EGM 100 are illustrated in FIG. 7B as being connected to the processor 112. It will be appreciated that the components may be connected to the processor 112 through a system bus 115, a communication bus and controller, such as a USB controller and USB bus, a network interface, or any other suitable type of connection.

The EGM 100 further includes a memory device 114 that stores one or more functional modules 120. Various functional modules 120 of the EGM 100 will be described in more detail below in connection with FIG. 1D.

The memory device 114 may store program code and instructions, executable by the processor 112, to control the EGM 100. The memory device 114 may also store other data such as image data, event data, player input data, random or pseudo-random number generators, pay-table data or information and applicable game rules that relate to the play of the gaming device. The memory device 114 may include random access memory (RAM), which can include non-volatile RAM (NVRAM), magnetic RAM (MRAM), ferroelectric RAM (FeRAM) and other forms as commonly understood in the gaming industry. In some embodiments, the memory device 114 may include read only memory (ROM). In some embodiments, the memory device 114 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 122, such as a hard disk drive or flash memory. The data storage device 122 may store program data, player data, audit trail data or any other type of data. The data storage device 122 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 112 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touchscreens, trackballs, touchpads, wheels, and wireless communication devices. In some embodiments, internal or external peripheral devices may communicate with the processor through a universal serial bus (USB) hub (not shown) connected to the processor 112.

U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera 127 in communication with the processor 112 (and possibly controlled by the processor 112) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 112 may incorporate that image into the primary and/or secondary game as a game image, symbol or indicia.

The EGM 100 may further include a microphone 125 connected to the sound card 28 and arranged to pick up sounds generated by the player.

Various functional modules of that may be stored in a memory device 114 of an EGM 100 are illustrated in FIG. 7C. Program code contained in the functional modules controls the processor 112 to perform the functions described herein. Referring to FIG. 7C, the EGM 100 may include in the memory device 114 a primary game module 120A that includes program instructions and/or data for operating a wagering game as described herein. The EGM 100 may further include a player tracking module 120B that keeps track of the identity and other information related to the current player, an electronic funds transfer module 120C that manages transfer of credits to/from the player's account, an audit/reporting module 120E that generates audit reports of games played on the EGM 100, a communication module 120F that manages network and local communications of the EGM 100, an operating system 20G and a random number generator 20H. The electronic funds transfer module 120C communicates with a back end server or financial institution to transfer funds to and from an account associated with the player. The communication module 120F enables the EGM 100 to communicate with remote servers and other EGMs using various secure communication interfaces. The operating system kernel 120G controls the overall operation of the EGM 100, including the loading and operation of other modules. The random number generator 20H generates random or pseudorandom numbers for use in the operation of the hybrid games described herein.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A gaming machine comprising:
a processor;
a video controller coupled to the processor;
a display device coupled to the video controller; and
an input device coupled to the processor and receiving an input from a player,
wherein the processor initiates a game in response to the input,
wherein the display device comprises a rear display panel and a front display panel arranged between the player and the rear display panel, the front display panel comprising an electrochromic display panel that is spaced apart from the rear display panel in a viewing direction of the player,
wherein the video controller causes the display device to alternate between a first state for displaying a first image on the rear display panel and a second state for displaying a second image on the front display panel,
wherein in the first state, the video controller displays the first image on the rear display panel and causes the front display panel to be transparent such that the first image is a visible image through the front display panel,
wherein in the second state, the video controller displays the second image on the rear display panel and causes the front display panel to be translucent such that the second image is displayed by the rear display panel onto the front display panel as a visible image on the front display panel, and
wherein in the second state, the video controller causes the rear display panel to display the second image with an increased brightness relative to a brightness of the first image, a quantity of the increased brightness being determined so as to compensate for absorption by the front display panel.

2. The gaming machine of claim 1, wherein the video controller modifies the first image and/or the second image to provide a monocular depth cue to a viewer of the display device that the first image is located farther away from the player than the second image.

3. The gaming machine of claim 2, wherein the monocular depth cue comprises at least one of occlusion, perspective, motion parallax, shadowing, lighting, and proportion.

4. The gaming machine of claim 1, wherein the front display panel is spaced apart from the rear display panel by a distance sufficient to impart binocular depth information to the player based on an expected viewing distance of the player.

5. The gaming machine of claim 1, wherein front display panel and the rear display panel are flat and arranged parallel to each other.

6. The gaming machine of claim 1, wherein the first image and the second image are the same image.

7. The gaming machine of claim 1, wherein the video controller outputs a first video signal and a second video signal to the rear display panel in an alternating pattern in which the first video signal causes the rear display panel to display the first image in first alternating time periods and the second video signal causes the rear display panel to display the second image in second alternating time periods between the first alternating time periods.

8. The gaming machine of claim 7, wherein the video controller outputs a control signal to the front display panel that causes the front display panel to be transparent during the first alternating time periods and translucent during the second alternating time periods.

9. The gaming machine of claim 1, wherein the display device further comprises a third display panel between the front display panel and the rear display panel, wherein the third display panel comprises an electrochromic display panel.

10. A display device, comprising:
a video controller;
a rear display panel; and
a front display panel overlapping the rear display panel in a viewing direction, the front display panel comprising an electrochromic display panel that is spaced apart from the rear display panel in a viewing direction,
wherein the video controller causes the display device to alternate between a first state for displaying a first image on the rear display panel and a second state for displaying a second image on the front display panel,
wherein in the first state, the video controller displays the first image on the rear display panel and causes the front display panel to be transparent such that the first image is a visible image through the front display panel, and
wherein in the second state, the video controller displays the second image on the rear display panel and causes the front display panel to be translucent such that the second image is displayed by the rear display panel onto the front display panel as a visible image on the front display panel, and
wherein in the second state, the video controller causes the rear display panel to display the second image with an increased brightness relative to a brightness of the first image, a quantity of the increased brightness being determined so as to compensate for absorption by the front display panel.

11. The display device of claim 10, wherein the video controller modifies the first image and/or the second image to provide a monocular depth cue to a viewer of the display device that the first image is located farther away from the viewer than the second image.

12. The display device of claim 11, wherein the monocular depth cue comprises at least one of occlusion, perspective, motion parallax, shadowing, lighting, and proportion.

13. The display device of claim 10, wherein the front display panel is spaced apart from the rear display panel by a distance sufficient to impart binocular depth information to the player based on an expected viewing distance of a viewer of the display device.

14. The display device of claim 10, wherein the front display panel and the rear display panel are flat and arranged parallel to each other.

15. The display device of claim 10, wherein the first image and the second image are the same image.

16. The display device of claim 10, wherein the video controller outputs a first video signal and a second video signal to the rear display panel in an alternating pattern in which the first video signal causes the rear display panel to display the first image in first alternating time periods and the second video signal causes the rear display panel to display the second image in second alternating time periods between the first alternating time periods.

17. The display device of claim 16, wherein the video controller outputs a control signal to the front display panel that causes the front display panel to be transparent during the first alternating time periods and translucent during the second alternating time periods.

18. The display device of claim 10, wherein the display device further comprises a third display panel between the front display panel and the rear display panel, wherein the third display panel comprises an electrochromic display panel.

19. A method of operating a display device including a rear display panel and a front display panel comprising an electrochromic display panel that is spaced apart from the rear display panel in a viewing direction, the method comprising:
generating a first image;
causing the front display panel to be in a transparent state;
displaying the first image on the rear display panel such that the first image is a visible image through the front display panel;
generating a second image;
causing the front display panel to change from the transparent state to a translucent state; and
displaying the second image on the rear display panel while the front display panel is in the translucent state such that the second image is displayed by the rear display panel onto the front display panel as a visible image on the front display panel; and
increasing a brightness of the rear display panel when the second image is being displayed on the rear display panel, a quantity of the increased brightness being determined so as to compensate for absorption by the front display panel.

20. The method of claim 19, wherein the front display panel and the rear display panel are flat and arranged parallel to each other.

* * * * *